(12) United States Patent
Jury et al.

(10) Patent No.: US 9,875,763 B1
(45) Date of Patent: Jan. 23, 2018

(54) RECOVERING USER DATA FROM A VARIABLY ENCROACHED DATA TRACK

(71) Applicant: Seagate Technology LLC, Cupertino, CA (US)

(72) Inventors: Jason C. Jury, Apple Valley, MN (US); Siong Liu, Singapore (SG); Joshua W. Christensen, Savage, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/332,475

(22) Filed: Oct. 24, 2016

(51) Int. Cl.
*G11B 5/596* (2006.01)
*G11B 20/18* (2006.01)
*G11B 20/12* (2006.01)

(52) U.S. Cl.
CPC ...... *G11B 5/59627* (2013.01); *G11B 5/59688* (2013.01); *G11B 20/1217* (2013.01); *G11B 20/18* (2013.01); *G11B 2020/1238* (2013.01)

(58) Field of Classification Search
None
See application file for complete search history.

(56) References Cited

U.S. PATENT DOCUMENTS

| | | | |
|---|---|---|---|
| 6,046,870 A * | 4/2000 | Karube | G11B 5/012 360/31 |
| 6,252,731 B1 | 6/2001 | Sloan et al. | |
| 6,538,839 B1 * | 3/2003 | Ryan | G11B 5/59694 360/75 |
| 6,754,030 B2 | 6/2004 | Seng et al. | |
| 7,088,535 B2 | 8/2006 | Kim et al. | |
| 7,215,494 B2 | 5/2007 | Wang et al. | |
| 7,813,069 B2 | 10/2010 | Evans et al. | |
| 7,920,350 B2 | 4/2011 | Au et al. | |
| 8,116,025 B1 | 2/2012 | Chan et al. | |
| 8,929,019 B2 * | 1/2015 | Tagami | G11B 21/106 360/31 |
| 9,236,099 B2 | 1/2016 | Albussien et al. | |
| 2002/0089778 A1 * | 7/2002 | Shimokoshi | G11B 5/012 360/77.02 |
| 2003/0202268 A1 * | 10/2003 | Wang | G11B 5/5547 360/31 |

* cited by examiner

*Primary Examiner* — Peter Vincent Agustin
(74) *Attorney, Agent, or Firm* — Hall Estill Attorneys at Law

(57) ABSTRACT

Method and apparatus for recovering user data from a rotatable data recording medium. In some embodiments, a moveable read element detects at least one uncorrectable read error in user data stored in a data sector arranged along a concentric track. A read retry operation is carried out to recover the user data by radially advancing the moveable read element from a first offset value to a different second offset value with respect to the track in accordance with a trajectory profile while transducing the user data from the data sector. This allows data that are variably overwritten (encroached upon) by different radial amounts from an adjacent track to be recovered.

20 Claims, 8 Drawing Sheets

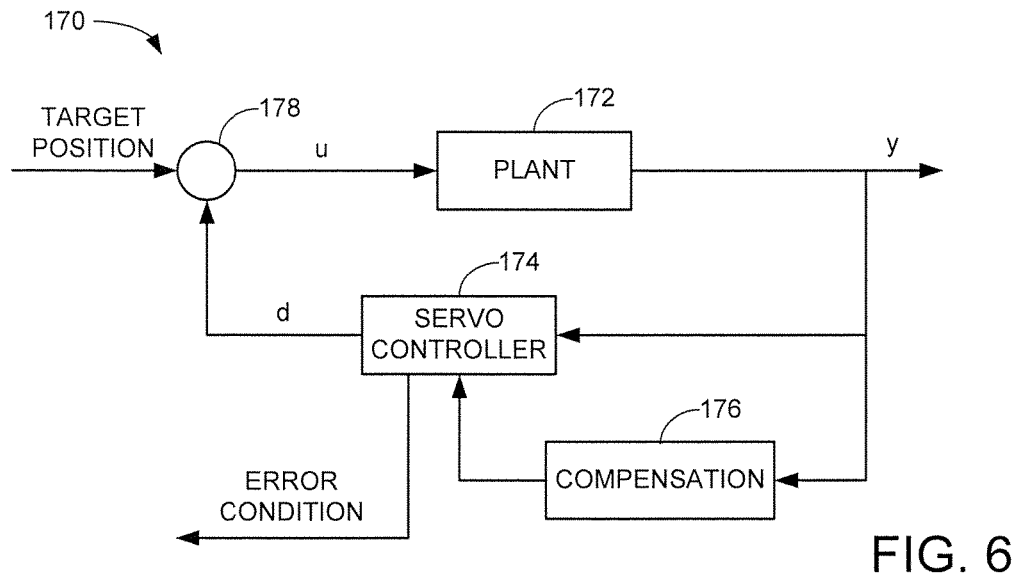
FIG. 6
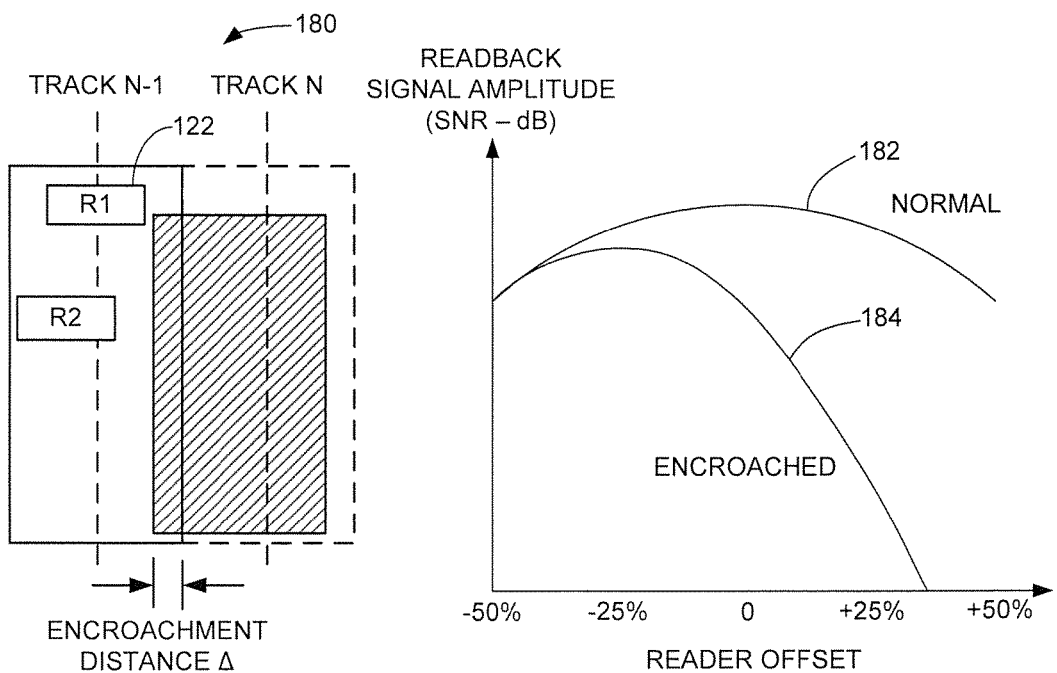
FIG. 7
FIG. 8

RECOVERING USER DATA FROM A VARIABLY ENCROACHED DATA TRACK

SUMMARY

Various embodiments of the present disclosure are generally directed to a method and apparatus for recovering data from a data storage device having rotatable media, such as a hard disc drive (HDD).

In some embodiments, a moveable read element detects at least one uncorrectable read error in user data stored in a data sector arranged along a concentric track. A read retry operation is carried out to recover the user data by radially advancing the moveable read element from a first offset value to a different second offset value with respect to the track in accordance with a trajectory profile while transducing the user data from the data sector.

In further embodiments, a data storage device has a rotatable data recording medium on which is defined a plurality of concentric tracks, each of the tracks having a plurality of data sectors. A moveable data transducer has a write element configured to write user data to the data sectors and a read element configured to read the user data from the data sectors. A control circuit is configured to, responsive to detection of a read error associated with a selected data sector on a selected track, perform a read retry operation to recover the user data from the selected data sector by radially advancing the read element in a single selected radial direction from a first radial offset value with respect to a center of the selected track at a beginning portion of the selected data sector to a different second offset value with respect to the center of the selected track at an end portion of the selected data sector during recovery of the user data from the selected data sector.

BRIEF DESCRIPTION OF DRAWINGS

FIG. 6 is a functional block diagram for a closed loop servo circuit of the data storage device of FIG. 2 in accordance with some embodiments.

FIG. 7 shows adjacent tracks on the medium of FIG. 2 in which data from one track partially overlaps (encroaches) data on an adjacent track.

FIG. 8 provides a graphical representation of readback signal amplitude response curves obtained at different offset positions (read offsets) for the encroached track in FIG. 7.

DETAILED DESCRIPTION

Figure 1:
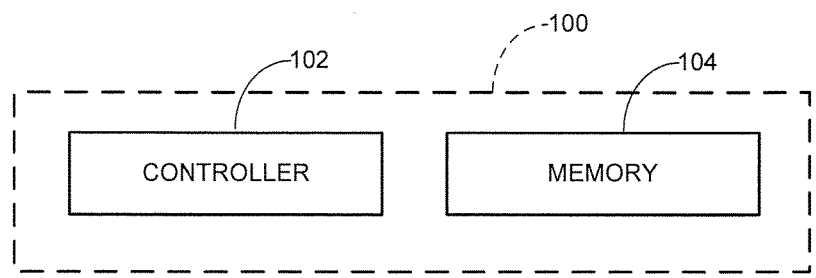
FIG. 1 is a simplified functional block diagram of a data storage device constructed and operated in accordance with various embodiments of the present disclosure.

The present disclosure is generally directed to data storage systems, and more particularly to recovery of data from a rotatable data recording medium having a variably overwritten (encroached) data track.

Data storage devices are configured to store and retrieve user data in a fast and efficient manner. Some data storage devices, such as hard disc drives (HDDs) and hybrid solid state drives (HSSDs), utilize rotatable data recording media (discs) to store user data in data sectors on concentric tracks. An array of read/write data transducers are controllably positioned adjacent the tracks to write and read user data.

Certain types of events during a write operation referred to as sudden write offtrack (SWOT) events may arise that provide a large displacement of the writer element during the writing of data to a given data sector. SWOT events can arise, for example, due to a short duration high intensity mechanical shock or vibration input that translates the write element radially during the writing of data to the sector.

Normally, modern drives utilize an observer/predictor model with embedded servo data to provide closed loop track following during read and write operations. OCLIM (off center limits, also referred to as write fault thresholds, WFTs) are often used to monitor the deviation of the position of the writer from the center of the track (or some other commanded position relative to the track being written). OCLIM values of +15%/−15% may be used, or some other value.

If during the writing of data the head exceeds the respective OCLIM value, a write fault will be declared and further writing to that data sector will be interrupted. The system will burn one or more revolutions to allow the system to bring the head back within the specified OCLIM "safe write zone" and the write operation will be repeated.

In some cases it has been found that, even if a write operation results in the maintenance of the head within the specified write fault threshold range, mechanical shocks or other events can cause a pronounced "drift" of the sector toward an adjacent track. This presents a number of problems including the possibility that an adjacent track may be partially overwritten (so called "adjacent track encroachment," or "ATE"). The use of smaller track widths and shingled magnetic recording (SMR) exasperates this effect.

Data are often written in digitally encoded form with one or more forms of error detection and correction (EDC) codes, such as BCH codes, Reed Solomon ECC codes, parity values, etc. The EDC codes enable the system to detect and correct up to selected numbers of errors in the recovered data from a given sector.

At such time that the system provides one or more uncorrectable read errors during a read operation, the device will enter a read recovery routine in an effort to re-read the data. A number of read recovery techniques are known in the art, including adjustments to the fly height of the transducer, the position of the transducer, different levels of EDC power, etc.

One well known technique during read retry operations is to position the read element at different relative positions with respect to the track. For example, a read element may be positioned some percentage of the track width, such as about +4%/−4% from the nominal track center (or other baseline read recovery position) in an effort to recover the data. This radial offset distance is sometimes referred to as read offset. The read element may be successively placed at other read offset values a number of times in an effort to successfully recover the data from the sector.

While operable, certain forms of SWOT events may provide a skewed shape to a given track so that the adjacent track has a variable amount of encroachment along one or more data sectors. In such cases, incremental advancements of the read element to different read offsets may be unsuccessful in recovering the data from the encroached track, since a given read offset may be suitable to recover data from a first portion of the data sector but not the second portion.

Accordingly, various embodiments of the present disclosure provide a radial translation of the read transducer as the transducer passes adjacent a given data sector during a read retry operation. Stated another way, the transducer will begin at a first offset value at the beginning of the sector and move continuously in a radial direction to a different, second offset value at the end of the sector so that all of the data from the data sector are read.

A number of techniques are disclosed herein to provide this recovery mechanism. In one embodiment, the sector is divided into segments and an optimal read offset is identified for each segment. Stitching these respective offsets together provides a profile that can thereafter be used to guide the transducer radially as the data sector is read. In another embodiment, optimal offsets for beginning and ending locations of the sector can be determined and an interpolation curve fit profile is selected to continuously move the transducer between these offsets.

Some analysis may include examining where, from a physical standpoint, the read errors are being detected; for example, if most read errors are at the beginning of the sector but none occur at the end of the sector, then that particular offset may be optimum for the latter portion of the sector. Similarly, locating another offset that works well for the beginning of the sector but induces errors toward the end of the sector may be an optimum offset value to begin the sweep.

Linear translation in a radial direction across the data sector is contemplated but not necessarily required. Based on the observer/predictor model, a commanded sector sweep profile can be calculated and adjustments applied to the VCM to induce the desired sweep as the head moves adjacent the sector.

Once the data are successfully recovered, the recovered data may be rewritten in place or in another location to eliminate the need to perform the extended recovery the next time the data from the selected sector are requested.

These and other features and advantages of various embodiments can be understood beginning with a review of FIG. 1 which provides a simplified representation of a data storage device 100 of the type used to store and retrieve user data from a host device. The device 100 includes a controller (control circuit) 102 and a memory module 104.

The controller 102 is a programmable processor based control circuit that provides top level communication and control functions as the device interfaces with the host device. Suitable programming instructions (firmware) are stored in a memory and executed by the processor as required to carry out the requisite functions.

Data from the host device is transferred for storage in the memory 104 responsive to a host write command, and returned back to the host from the memory responsive to a host read command. The memory can take a variety of forms, including rotatable magnetic recording media as set forth in FIG. 2.

Figure 2:
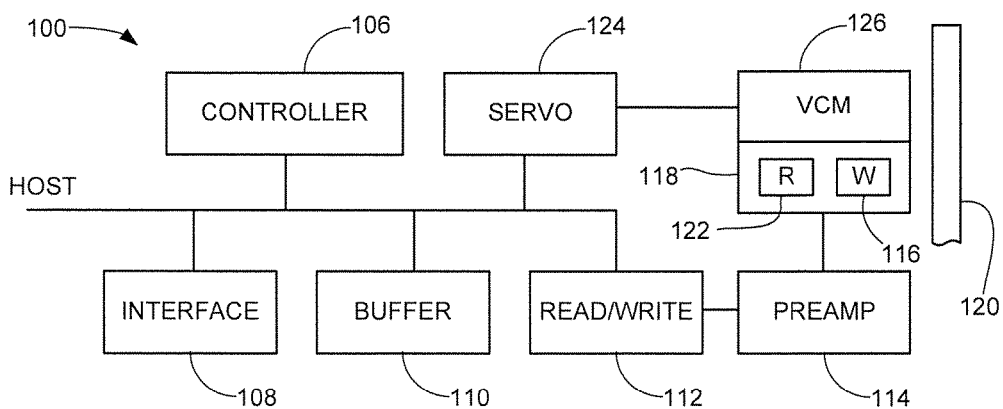
FIG. 2 is a schematic representation of aspects of the data storage device of FIG. 1 characterized as a hard disc drive (HDD) in accordance with some embodiments.

FIG. 2 is a generalized functional representation of the data storage device 100 of FIG. 1 in accordance with some embodiments. The internal architecture can vary as required so FIG. 2 is meant to convey a general overview of various systems, circuits and components. Other forms can be used.

The device 100 in FIG. 2 is characterized as a hard disc drive (HDD) and includes a top level controller (control circuit) 106, which may correspond to the controller 102 in FIG. 1. A host interface circuit 108 provides communications with the external host under the direction of the controller 106, including the processing of data transfers, commands, status requests, etc. A buffer memory 110 provides for the temporary storage of user data pending transfer to/from the host, and may store other data as well such as control parameters, programming used by the controller 106, etc.

A read/write (R/W) channel circuit 112 provides signal conditioning during write and read operations. User data to be written by the device 100 are encoded by a write portion of the channel 112 such as via encryption, compression, run length limited (RLL) encoding, error detection and correction (EDC) encoding, etc. Encoded data are supplied to a preamplifier/driver (preamp) circuit 114 which applies bi-directional, time varying write currents to a write element (W) 116 of a data transducer 118. The write element 116 may take the form of a perpendicular write coil that writes a corresponding sequence of magnetic flux transitions to tracks defined on a rotatable recording medium (disc) 120.

During a read operation to recover previously written data, a read element (sensor) 122 of the transducer 118 detects the magnetic pattern to generate a readback signal that is preamplified and conditioned by the preamp 114 and forwarded to the channel 112. A read portion of the channel 112 applies signal processing to the recovered signal including detection, decoding, decryption, decompression, error detection and correction, etc. to output the originally stored data to the buffer 110. The interface 108 thereafter transfers the data to the requesting host. The read sensor 122 can take a variety of forms, such as a magneto-resistive (MR) sensor or the like.

A servo control circuit 124 operates to position the respective write and read elements 116, 122 adjacent the disc 120 during read and write operations. Servo data written to the disc 120 are detected by the read sensor 122, demodulated by the channel 112 and processed by the servo control circuit 124 to generate a position signal indicative of the radial position of the read sensor. A corresponding current command signal is input to a voice coil motor (VCM) 126 affixed to the transducer 118 to adjust the position of the transducer accordingly. It is contemplated that the VCM 126 and the transducer 118 are supported by a rotary swing-arm type actuator 128 which causes the transducer to take an arcuate path across the disc 120. Because of this path, as well as the fact that a gap exists between the respective write element 116 and read sensor 122, the transducer 118 may be positioned in slightly different locations when accessing a selected track for respective write and read operations.

Figure 3:
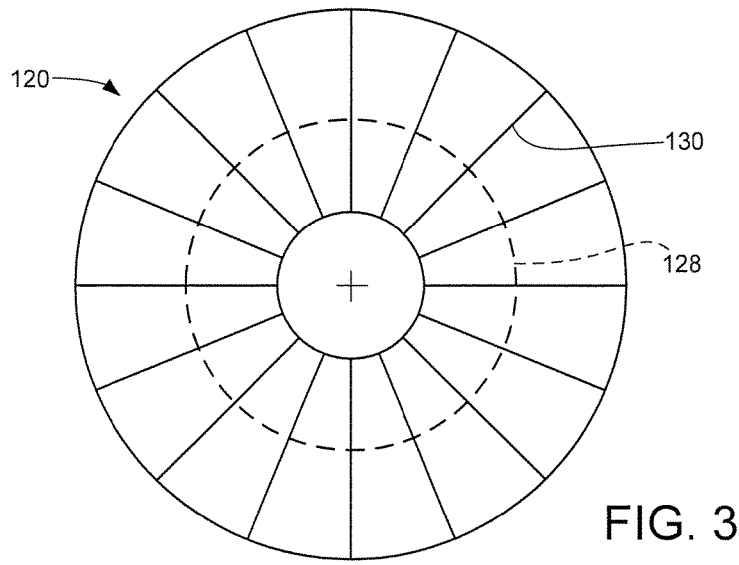
FIG. 3 shows a rotatable magnetic recording medium (disc) from FIG. 2.

FIG. 3 depicts the magnetic recording disc 120 from FIG. 2 in accordance with some embodiments. One exemplary track is denoted in broken line fashion at 128. In practice, adjacent tracks are provided across the media recording surface of the disc 120 from an outermost diameter (OD) to an innermost diameter (ID). Zone based recording (ZBR) techniques may be employed so that the tracks are arranged into concentric zones. In ZBR recording, all of the tracks 128 in each zone are written at a constant frequency, with a different selected frequency for each zone. This allows higher recording frequencies to be utilized adjacent the OD of the disc and lower recording frequencies adjacent the ID of the disc.

Servo data fields 130 are arranged in the form of spaced apart servo wedges that radially extend across the disc recording surfaces much like spokes on a wheel. The servo data fields 130 store the servo data utilized by the servo circuit 124 to provide positional control of the transducer(s) as discussed above in FIG. 2. While only a few servo fields 130 are shown in FIG. 3 for purposes of illustration, it will be understood that a larger number of servo fields will usually be provided per track, such as but not limited to about 200-400 servo fields per track.

Figure 4:
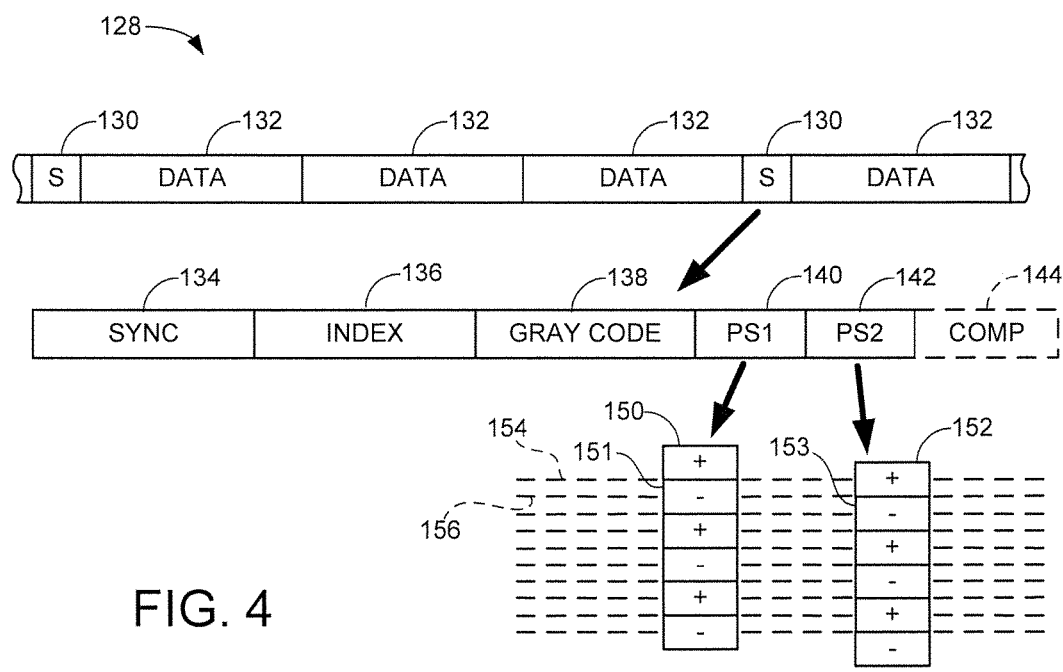
FIG. 4 shows an exemplary format for servo and data tracks defined on the data recording surface of FIG. 2.

FIG. 4 provides a generalized format for the exemplary track 128 from FIG. 3. Other formats can be used. The servo fields 130 from FIG. 3 are denoted as (S) fields. Regions between adjacent pairs of the servo fields 130 are used to define a series of data blocks, or data sectors 132. The data sectors each store a fixed amount of encoded user data, such as 512 bytes.

An exemplary format for each servo field 130 can include a synchronization (sync) field 134, an index field 136, a Gray code (track ID) field 138, and servo positioning fields PS1 140 and PS2 142. Other formats can be used. One or more optional compensation (comp) fields 144 can be appended to at least certain ones of the servo fields 130 to store RRO compensation values. The RRO compensation values are used to correct for radial misalignments of the PS1/PS2 fields 140, 142 to enable the head to nominally follow a concentric circular path along each track.

Generally, the sync field 134 is a unique bit sequence to signal to the servo circuit passage of a servo field 130 adjacent the transducer 114. The index field 136 signifies the angular position of the servo field, and the Gray code field 138 signifies the radial position of the servo field on the disc surface.

The PS1 and PS2 fields 140, 142 are alternating servo burst fields with variable polarities as shown. The PS1 fields 140 are each arranged as radially aligned positive (+) burst fields 150 and negative (−) burst fields 151. The PS2 fields 142 are similarly arranged as +burst fields 152 and −burst fields 153. Servo nulls 154 are defined at the juncture between each adjacent pair of the bursts 150, 151 in the PS1 fields 140, and servo nulls 156 are defined at the junction between each adjacent pair of the bursts 152, 153.

The PS1 and PS2 fields are radially offset to define the nulls 154, 156 at half-track locations. These define so-called servo tracks which can be used to define to define the locations of the data sectors 132. The position of the read sensor 122 with respect to the track 128 (see FIGS. 2-3) can be determined in relation to the relative amplitude and phase of the outputs provided by the PS1 and PS2 fields.

Figure 5:
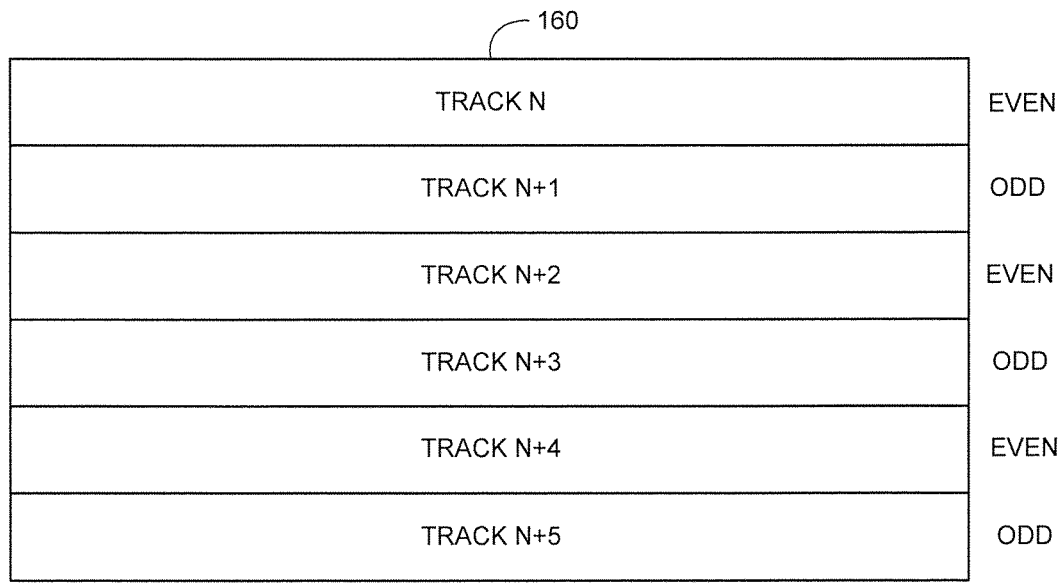
FIG. 5 shows alternating (even and odd) data tracks in accordance with some embodiments.

FIG. 5 shows a number of adjacent tracks 160 similar to the track 128 in FIG. 4. The tracks are arbitrarily denoted as track N to track N+5. It is contemplated that the tracks 160 reside within a given concentric zone on the disc 120. The tracks are divided into alternating odd (bottom) and even (top) tracks, with each even track disposed between an adjacent pair of the odd tracks. It is contemplated that odd and even tracks such as the tracks 160 in FIG. 5 are written using interlaced magnetic recording (IMR) techniques so that a first type of the tracks, such as the odd tracks, are written first (e.g., the bottom tracks), followed by the writing of the even tracks (the top tracks). Such is merely illustrative and is not limiting.

FIG. 6 provides a functional block diagram of a servo control circuit 170 of the data storage device 100 in some embodiments. The circuitry 170 is generally incorporated into the servo control block 124 of FIG. 2. A plant block 172 represents the transducer 118, VCM 126 and disc 120 of a given head/disc interface. A feed forward servo controller, also sometimes referred to as an observer or observer/predictor, is denoted at 174. A compensation circuit is represented at 176, and a summing junction at 178. Other circuits may be included in the loop such as filters, gain compensators, disturbance rejection circuits, etc. These and other features have been omitted for purposes of simplicity but can readily be used as desired.

The servo controller 174 may be realized using a programmable processor with associated programming instructions (firmware) that are executed by the processor. In some cases, the servo firmware used by the servo circuit 170 may form a portion of the overall firmware discussed above, and thus may also be subject to upgrades from time to time. The servo controller 174 may also be referred to as an observer, an observer/predictor, etc. Input to the plant 172 is a current command signal u. The output from the plant 172 is a position y indicative of the resulting position of the transducer as a result of the input correction value. The position y is fed to the servo controller 174 which uses plant modeling and estimating features to enable the outputting of a control signal d.

The position y is further fed to the compensation block 176 which utilizes the RRO compensation values discussed above in FIG. 4 to selectively provide correction inputs to the controller 174 in generating the control signal d. A target position indicative of the desired position of the head is summed at summing junction 178 with the control signal d to provide the input current command u to the plant.

A state estimator model may be used so that a multiple of estimated positions of the head are supplied in between the occurrence of the servo fields 130 (FIG. 4). That is, the servo controller 174 normally receives and uses the servo information from each servo field 130, including the PS1/PS2 data (fields 140, 142) to generate the control signal d. Additional estimates of head position, and associated control outputs, may be provided at samples between adjacent pairs of the servo fields.

Error conditions may be detected and output by the servo controller, as indicated in FIG. 6, for a variety of reasons such as a write fault or read fault condition in which the head position is outside a predetermined tolerance (radial distance, such as a percentage of off track distance from the center of the track). A write fault condition may result in the interruption of further writing to a given data sector. A read fault may allow the system to continue to attempt to recover the data from the sector, or may result in one or more read retry operations.

FIG. 7 shows a pair of adjacent tracks 180 similar to the tracks discussed above. The tracks are arbitrarily denoted as tracks N and N−1. Ideal placement of track N is shown in dotted line fashion. The actual location of the data on track N is shown in cross-hatched fashion. It is contemplated that a mechanical disturbance occurred during the writing operation that caused the write element (116, FIG. 2) to move off-track from the ideal track writing position.

It will be noted that generally, the ideal track layout in a drive such as 100 is determined during manufacturing so that the drive has enough operating margin for the range of mechanical disturbances that would normally be experienced in the field. If the disturbance during write operation is severe enough, then adjacent track encroachment (ATE) can occur. In ATE, the intended data written to the drive encroaches on the data on the adjacent track, as depicted in FIG. 7 where track N has encroached upon track N−1 by an encroachment distance A.

This encroachment causes the data on track N−1 to have a lower amplitude and higher noise (e.g., a degraded signal-to-noise ratio or SNR). This can lead to the data being difficult to recover when requested by the host. Generally, the mechanical disturbances lead to ATE that is slowly varying within a data sector 132 (see FIG. 3). In other words, the position of the encroaching data at the start and end of the ATE do not change significantly.

When data are difficult to recover, usually the drive 100 will resort to error recovery (ER) procedures that improve the SNR of the readback data. One common recovery procedure is to try different positions of the read element 122 during read-back of the data. In this procedure, the read element is fixed at different cross-track positions, or read offsets, while attempting to read the data. This step can be an effective way to improve the SNR for encroachment stress; since the best read offset during a read operation will not be the default offset that is normally applied to read the data from the track.

For example, position R1 in FIG. 7 represents the normal, or default readback position, which is nominally aligned with the center of track N−1. Position R2 has a read offset of about −25% with respect to the center of the track. Improved recovery of the data from track N−1 is achieved using offset R2. For reference, offsets may be measured as a percentage of track pitch (TP), which is the nominal distance between the centers of adjacent tracks.

As shown by FIG. 7, curves 182 and 184 are respective readback (SNR) response curves for a normal track and an encroached track (such as track N−1). From FIG. 7 it can be seen that, generally, optimal SNR is achieved using an offset of about −25% TP.

Generally, mechanical disturbances will tend to shift data encroachments in a manner as set forth by FIG. 6. However, sometimes mechanical events can arise that induce relatively large, localized off-track movement of the write element. One example of such events is a so-called sudden write off-track (SWOT) event.

In a SWOT event, the off-track motion of the write head is relatively large (such as, for example, >25% of track pitch) and occurs in a very short time (such as, for example, within a single data sector). A SWOT event can occur in a disk drive when the drive is subjected to a mechanical shock, thermal cycle, or other high-frequency mechanical disturbance.

Figure 9:
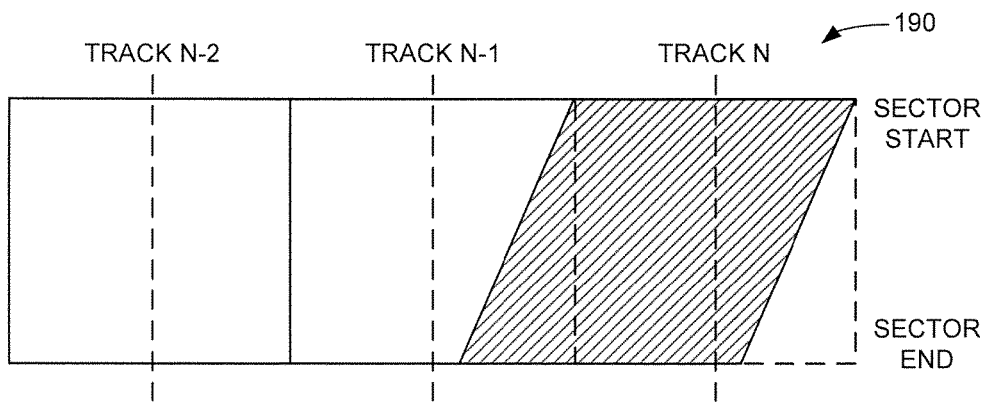
FIG. 9 shows another set of adjacent tracks on the medium of FIG. 2 in which a selected track is subjected to variable encroachment by an adjacent track.

If a severe SWOT event occurs, the tracks adjacent to the track being written will likely be challenging to recover. This situation is depicted in FIG. 9, which shows three adjacent tracks 190 denoted as tracks N, N−1 and N−2. Track N was subjected to a SWOT event, resulting in a variable encroachment upon track N−1. A beginning of the associated sector (sector start) is largely aligned correctly, but an end of the sector (sector end) significantly encroaches upon track N−1. While the encroachment is shown to be substantially linear in nature, it will be appreciated that this is merely for simplicity of illustration as the encroachment profile during a SWOT may take any number of linear or curvilinear forms.

Figure 10:
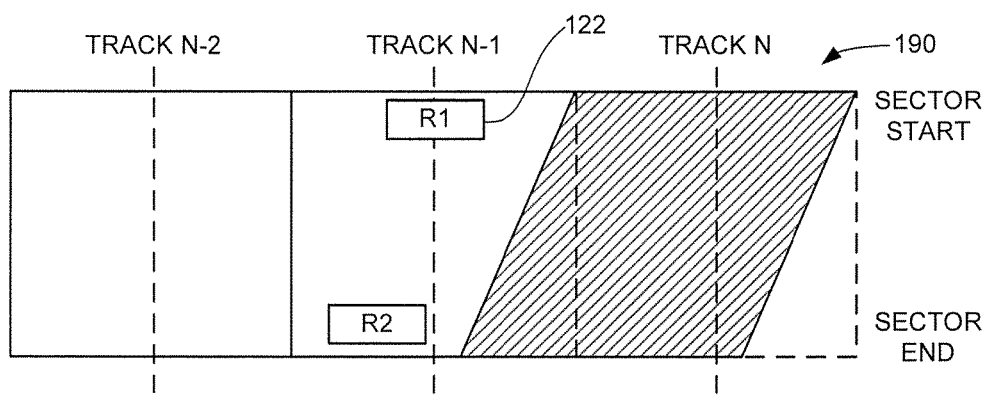
FIG. 10 corresponds to the tracks in FIG. 9 to illustrate different read offsets that may be used to recover the user data from the encroached track.

Accordingly, various embodiments of the present disclosure provide a mechanism to recover data from encroached tracks such as N−1 using a variable offset approach. It can be seen from FIG. 10 that a first position R1 for the read element 122 may be suitable for recovering data at the beginning of the sector, but not for latter portions of the sector. Similarly, a second position R2 for the read element 122 may be suitable for recovering data at the end of the sector, but not for previous portions. Various embodiments provide a variable read position profile so that the read element is radially advanced during the reading of the entirety of the data sector during a single pass.

Figure 11:
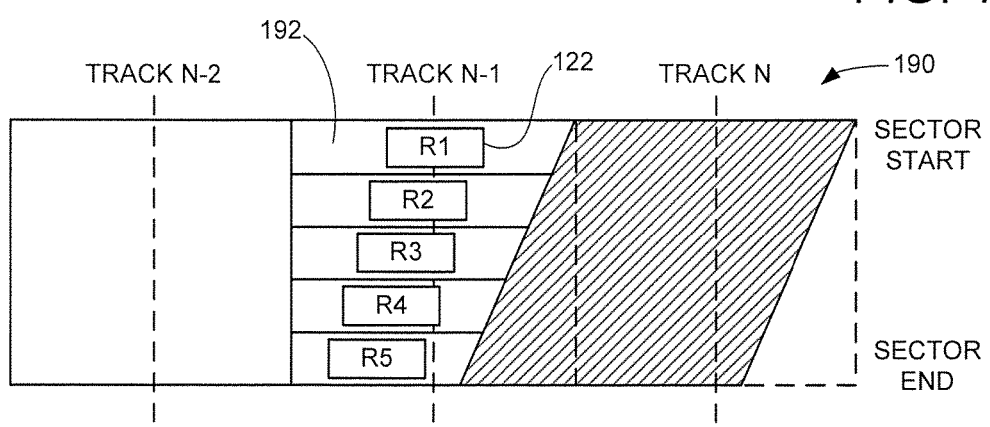
FIG. 11 corresponds to the tracks in FIGS. 9 and 10 and illustrates different read offsets for a plurality of successive segments of the data sector on the encroached track.

In one embodiment, a given data sector (or other unit of data along the track) subjected to encroachment is divided into a number of segments 192, as shown in FIG. 11. The segments may each be of equal length (e.g., a selected number of channel bits, etc.) or may be of variable length. A best read position offset is determined for each segment and applied to the read element, as shown by FIG. 11.

The optimal read position for each sector segment 192 can be found by finding the highest ADC (automatic gain control) or FIR (finite impulse response) sample amplitude from the read channel for a selection of different offsets. Alternatively, PES (position error signal) data stored during the writing of track N may be used. Other metrics may be used as well, including channel quality measurements, BER (bit error rates), etc. Thereafter, the read element 122 is successively positioned over each segment in turn, as shown by reader positions R1 through R5 in FIG. 11. While discrete movements may be used, it is contemplated that the read element may be smoothly and continuously advanced in the direction shown to follow the optimum readback profile across the sector.

Figure 12:
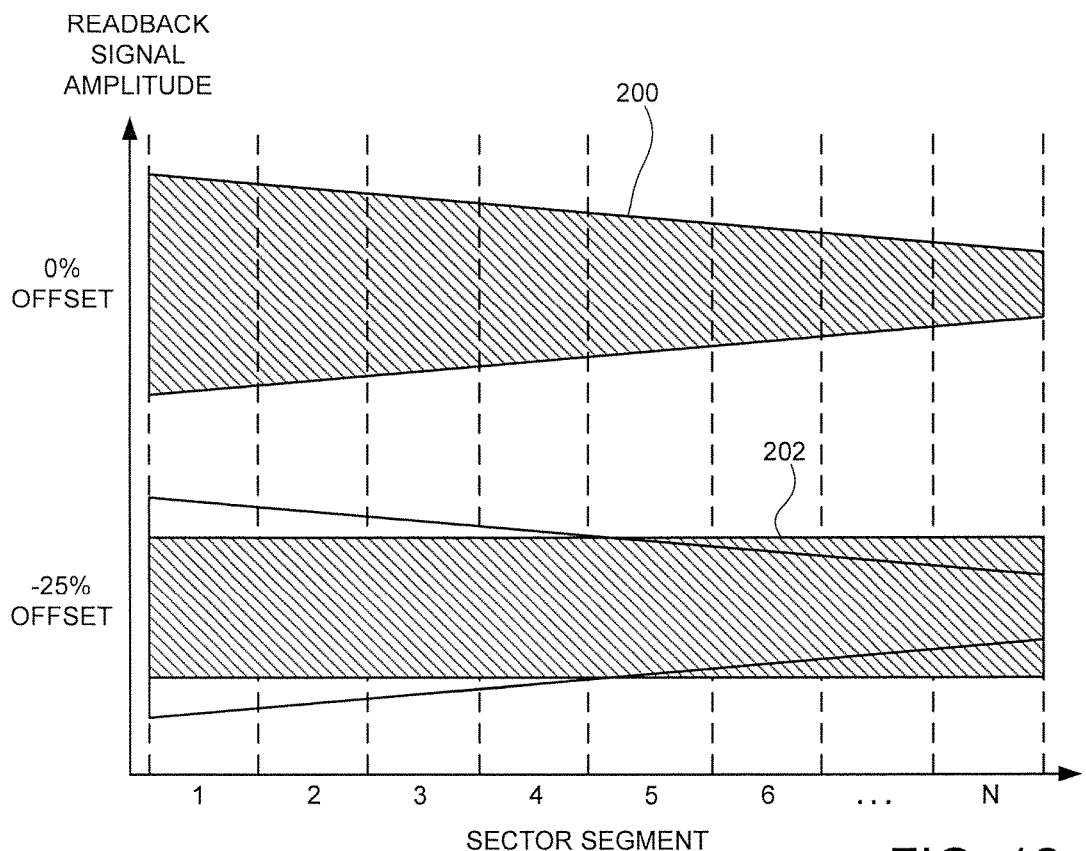
FIG. 12 shows different readback signals that may be recovered from the selected data sector on the encroached track at different read offsets.

FIG. 12 is a graphical representation of different readback signals 200, 202 (shown in cross hatched zones) obtained from track N−1 in FIG. 11 at different offsets. Signal 200 represents a 0% offset, and signal 202 represents a −25% offset. From FIG. 12 it can be seen that the 0% offset provides adequate readback SNR performance for initial segments but progressively degrades over time. The −25% offset provides a lower overall SNR performance across all the segments. By repeating the above process for different offsets, an optimal offset value can be determined for each segment.

Figure 13:
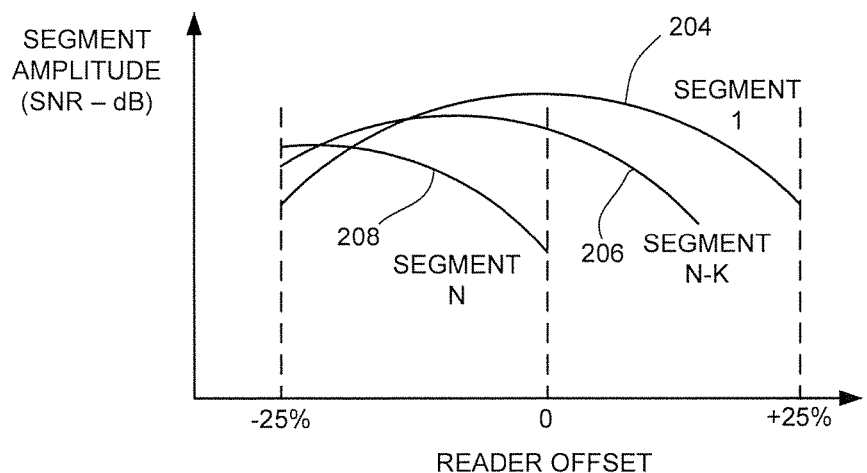
FIG. 13 shows different readback amplitude response curves for different segments.

FIG. 13 provides corresponding readback (SNR) response curves 204, 206 and 208 for a first segment (Segment 1), an intermediate segment (Segment N-K), and the last segment (Segment N). An optimal offset can be selected for each segment in a manner similar to that discussed above in FIG. 8.

Figure 14:
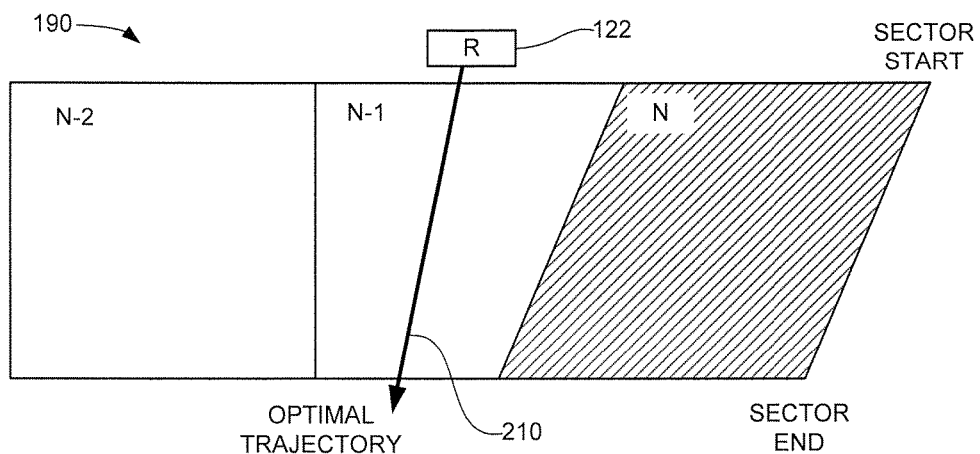
FIG. 14 illustrates a trajectory path for the encroached track in FIG. 11.

Once optimal read offsets are selected for each segment the servo controller circuit 174 (FIG. 6) synthesizes the respective offsets to define a trajectory that can be achieved during a single read of the data sector. An optimal trajectory for the read element 122 is generally denoted by path (arrowed line) 210 in FIG. 14. An advantage of this approach is that subsequent error recovery steps for the associated data sector(s) can benefit from the learned optimal profile.

As required, the profile can be adaptively adjusted until the data can be successfully recovered from the data sector(s) without the presence of uncorrectable errors.

Figure 15:
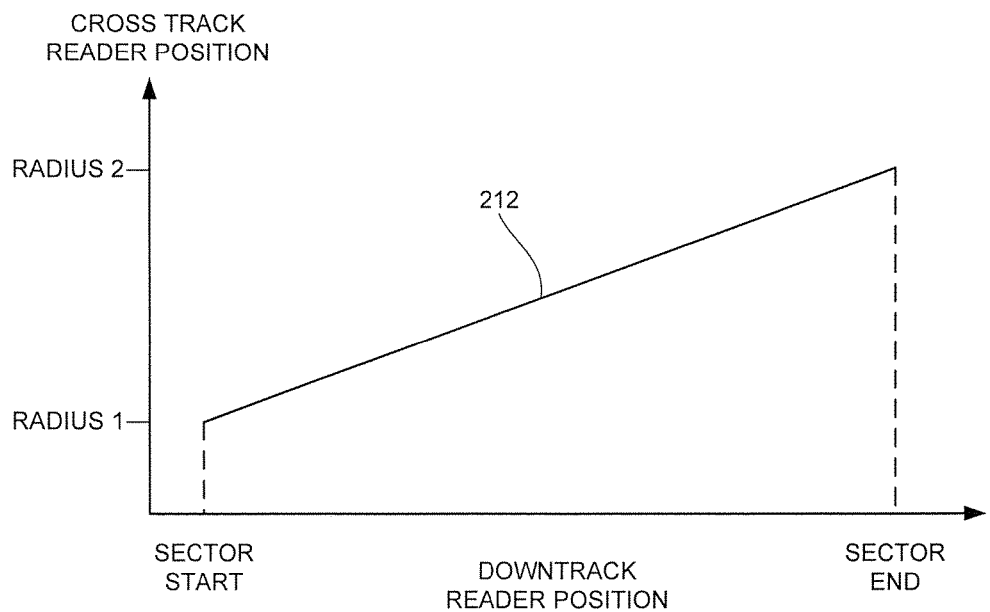
FIG. 15 shows cross-track and downtrack displacement of the read element to follow the trajectory path from FIG. 14.

FIG. 15 shows a displacement curve 212 that corresponds to the trajectory path 210 and indicates the displacement of the read element both in the downtrack (x-axis) and cross-track (y-axis) directions. As noted previously, while a substantially linear profile can be used, other forms can be applied as well including curvilinear profiles, discontinuous profiles, etc. Once the data are recovered, the track may be rewritten in place or moved to a new location on the media.

Figure 16:
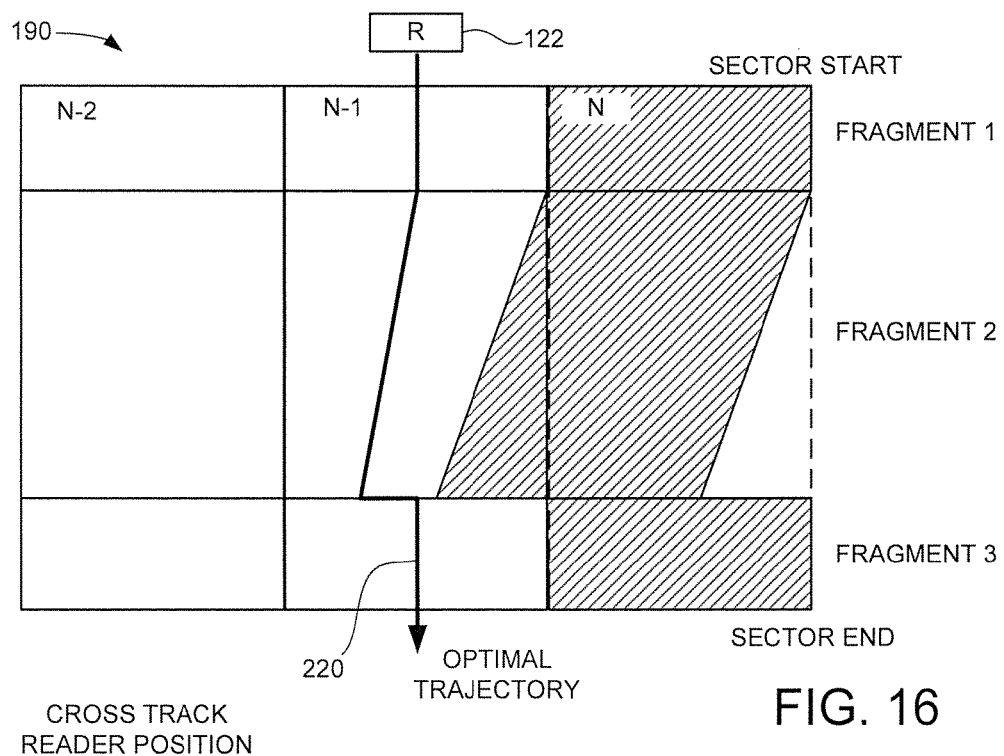
FIG. 16 shows another trajectory path for another variable encroachment pattern.

FIG. 16 shows the tracks 190 with a different form of SWOT event having been applied to track N during the writing of a selected data sector. In this case, the data sector includes three successive fragments (Fragments 1-3). Fragments 1 and 3 are nominally aligned and written in the desired location, but intermediate Fragment 2 shows a variable encroachment onto track N−1. It is contemplated that, depending on the types and severity of SWOT events, any number of variable encroachment patterns may be obtained.

In order to recover the data from track N−1, the foregoing analyses can be carried out, including breaking each of the fragments into segments and empirically determining a suitable read offset for the read element 122. The optimal offsets can thereafter be assembled by the servo controller 174 to define an optimal trajectory 220, as shown. It will be noted that instantaneous step movements such as indicated at the transition from Fragment 2 to Fragment 3 may not be achievable, but short step movements can be carried out to follow the desired trajectory.

Figure 17:
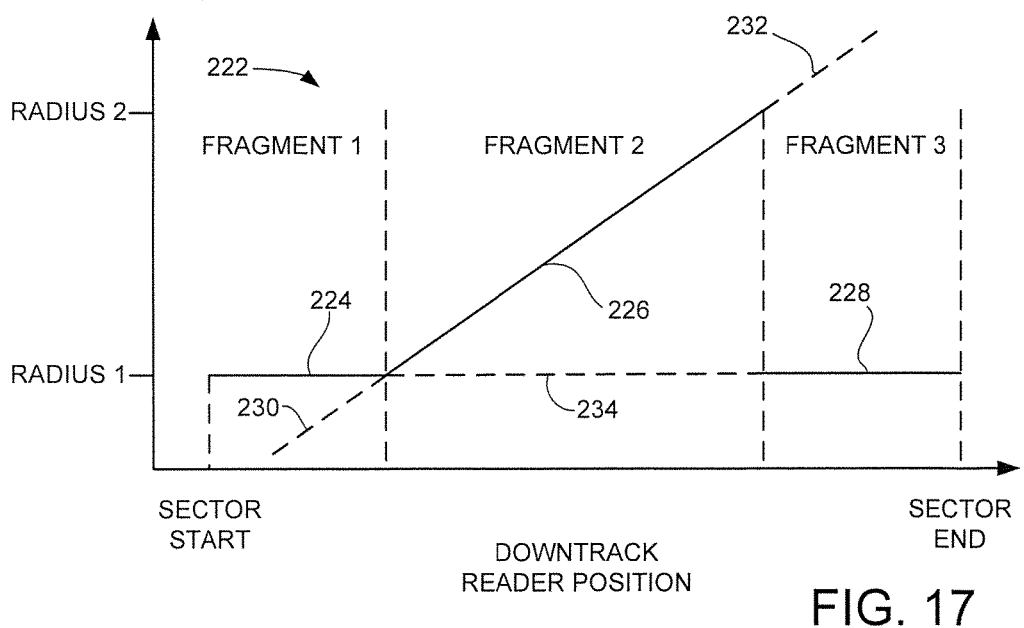
FIG. 17 shows cross-track and downtrack displacement of the read element to follow the trajectory path from FIG. 16.

FIG. 17 provides a displacement curve 222 to graphically illustrate the radial movement of the read element 122 during the reading of the sector from track N−1 in FIG. 16. As before, the displacement is depicted in both downtrack and cross-track directions. A first portion 224 of curve 222 shows nominally no offset for Fragment 1. A second portion 226 shows a linear progression across Fragment 2, and a third portion 228 shows a step change in position to read the data from Fragment 3.

In this way, substantially any encroachment pattern can be sensed, evaluated and a suitable readback trajectory developed to enable the data to be reliably recovered from the variably encroached track.

Figure 18:
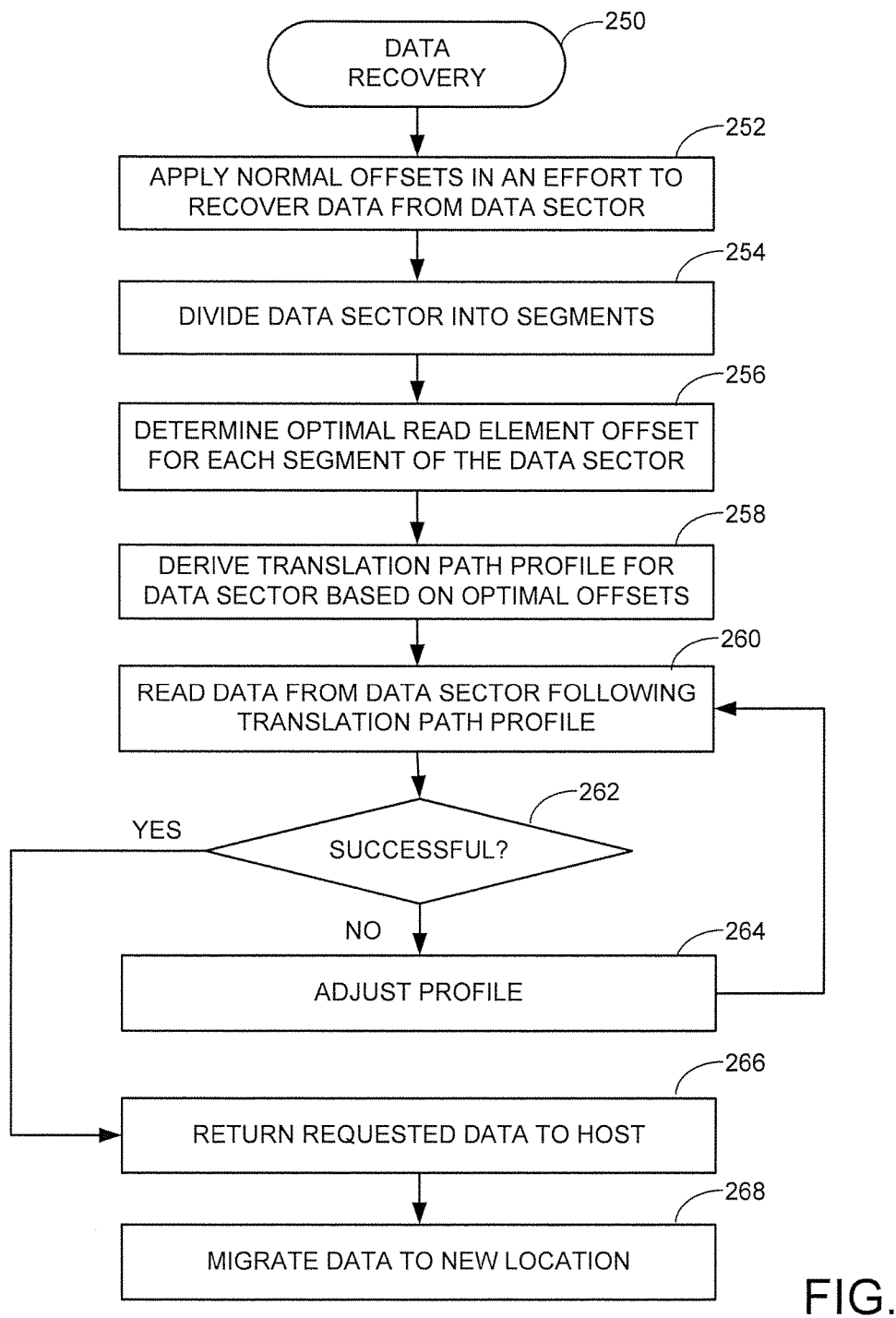
FIG. 18 is a flow chart for a data recovery routine illustrative of steps that may be carried out in accordance with some embodiments.

FIG. 18 is a flow chart for a data recovery routine 250 to summarize the foregoing discussion. The routine 250 may constitute programming instructions carried out by various circuits of the data storage device 100, including by the top level controller 106, the servo controller 174, or some other portion of the device. It will be appreciated that the routine is merely exemplary and may be modified as required. It is contemplated that the data recovery routine forms a portion of a larger data recovery scheme of the device, and is enacted responsive to the readback of data from a selected data sector having at least one unrecoverable error.

As shown by step 252, the data recovery operation may include an initial effort to read back the data from the data sector using normally applied read offsets, such as discussed above in FIGS. 7-8. If the encroachment of the selected data sector is nominally constant, a single read offset may be sufficient to recover the data. It is contemplated, however, that the read error associated with the data sector involves variable encroachment such as resulting from a SWOT event as discussed above. This may be detected by the system not being able, after multiple tries, to locate a single read offset sufficient to recover the data without uncorrectable read errors.

Accordingly, the flow of FIG. 18 passes to step 254 where the data sector is divided into segments. Any suitable number of segments may be selected depending on a number of factors, including the length of the sector (e.g., 512 bytes v. 4096 bytes, etc.), the location of the sector (including the write frequency), the type of data track (including a shingled track), and so on.

An appropriate, or optimal offset value (in terms of radial displacement in a cross-track direction) is determined for the read element for each segment, step 256. This may require several rotations of the disc as the various offsets are applied and the performance metric (e.g., channel quality, BER, SNR, etc.) is evaluated. In some cases, data obtained during step 252 may be accumulated and used as part of this analysis.

At step 258, a suitable translation path profile is derived to enable the servo circuit to apply a variable translation offset to the read element during a single pass of the data sector, so that the entirety of the data sector (or other data set) can be read. The profile is applied by the servo circuit at step 260 in an attempt to read the data from the sector.

Decision step 262 determines whether the read operation was successful; if not, the profile is adjusted at step 264 and the sector is re-read using the new, adjusted profile at step 260. At such time that the read operation is successful, the flow passes from step 262 to step 266 where the requested data are returned to the host, and the recovered data are rewritten to the media, such as to a new location, step 268. In some cases, multiple tracks worth of data in the vicinity of the data sector may be recovered and rewritten.

It will now be appreciated that the various embodiments presented herein can provide a number of benefits. Data from sectors subjected to variable encroachment can be recovered, enhancing the reliability of the device in returning data to the host. While various embodiments have discussed recovery on a per-data sector basis, it will be appreciated that other forms of data sets, including multiple sector groups, can be subjected to the foregoing analysis. In some cases, a readback trajectory can be developed for a plural number N data sectors that are successively arranged along a given track (or tracks), with some of the data sectors employing a constant offset and others employing a variable offset. This can facilitate recovery of a larger block of data, such as a set of data sectors protected by a common set of outercode, in an efficient manner.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
    using a moveable read element to detect at least one uncorrectable read error in user data stored in a data sector arranged along a concentric track at a nominally fixed radius with respect to a rotatable data recording medium; and
    performing a read retry operation to recover the user data by radially advancing the moveable read element from a first radial offset value with respect to the nominally fixed radius adjacent the beginning of the data sector to a different second offset value with respect to the nominally fixed radius adjacent an end of the data sector in accordance with a continuous sweep profile while transducing the user data from the data sector so that the read element continuously changes radial position from the first radial offset value to the second radial offset value during the transducing of the user data from the data sector.

2. The method of claim 1, wherein the read element is radially advanced responsive to a trajectory profile comprising different target offset values for the read element at different locations along the data sector.

3. The method of claim 1, wherein the read retry operation comprises dividing the data sector into a plurality of successive segments, identifying a different offset value for the read element for each of the plurality of successive segments that provides a desired read back response for the associated segment, deriving a trajectory path that nominally follows the different offset values for each of the plurality of successive segments, and moving the read element along the trajectory path from a first end to a second end of the data sector while reading the user data from the data sector.

4. The method of claim 1, wherein the read element is moved in a selected linear direction across a width of the data sector.

5. The method of claim 1, wherein the data track is a first data track and the method further comprises a prior step of writing data to a second data track adjacent the first data track that variably encroaches onto the data sector on the first data track along a length of the data sector, and wherein the read element is radially advanced responsive to said variable encroachment to recover the data from the data sector.

6. The method of claim 1, wherein the read retry operation comprises applying the first offset value to the read element and obtaining a first readback amplitude response from a first portion of the data sector that exceeds a selected threshold, applying the second offset value to the read element and obtaining a second readback amplitude response from a different, second portion of the data sector that exceeds a selected threshold, wherein the first offset value provides a third readback amplitude response from the second portion of the data sector below the selected threshold and the second offset value provides a fourth readback amplitude from the first portion of the data sector below the selected threshold.

7. The method of claim 1, wherein the read element is a magneto-resistive (MR) sensor and the medium is a rotatable magnetic recording medium.

8. The method of claim 1, further comprising using a selected one of a channel quality measurement or a bit error rate (BER) measurement to select the first and second offset values.

9. The method of claim 1, wherein the read element is continuously swept in a radial direction across the data sector from the first of the data sector to the last of the data sector during the reading of the data therefrom toward a selected one of an innermost diameter (ID) or an outermost diameter (OD) of the medium.

10. The method of claim 1, wherein the data sector is a first data sector, a second data sector is disposed adjacent the first data sector along the concentric track, and the read retry operation comprises reading user data from the first data sector applying a variable radial offset to the read element and reading user data from the second data sector applying a fixed radial offset to the read element during a single revolution of the medium.

11. The method of claim 1, further comprising transferring the user data from the data sector recovered during the read retry operation to a host device.

12. The method of claim 1, wherein the read element is disposed in a moveable data transducer, the data transducer further having a write element, the method further comprising a subsequent step of rewriting the user data recovered from the data sector during the read retry operation to the medium using the write element.

13. A data storage device comprising:
a rotatable data recording medium on which is defined a plurality of concentric tracks, each of the tracks having a plurality of data sectors;
a moveable data transducer having a write element configured to write user data to the data sectors and a read element configured to read the user data from the data sectors; and
a control circuit configured to, responsive to detection of a read error associated with a selected data sector on a selected track, perform a read retry operation to recover the user data from the selected data sector by radially advancing the read element in a single selected radial direction from a first radial offset value with respect to a center of the selected track at a beginning portion of the selected data sector to a different second offset value with respect to the center of the selected track at an end portion of the selected data sector during recovery of the user data from the selected data sector, the read retry operation comprising dividing the selected data sector into a plurality of successive segments, identifying a different offset value for the read element for each of the plurality of successive segments that provides a desired read back response for the associated segment, deriving a trajectory path that nominally follows the different offset values for each of the plurality of successive segments, and moving the read element along the trajectory path from a first end to a second end of the data sector.

14. The data storage device of claim 13, wherein the medium is a magnetic recording medium and the selected data sector on the selected track is partially encroached by data on an immediately adjacent track at a variable rate along the length of the selected data sector, wherein the radial advancement of the read element by the control circuit follows a contour of said encroachment by the immediately adjacent track.

15. The data storage device of claim 13, wherein the read element is radially advanced responsive to a trajectory profile comprising different target offset values for the read element at different locations along the data sector.

16. The data storage device of claim 13, wherein the control circuit is characterized as a servo control circuit configured to position the data transducer adjacent different radial locations on the medium using embedded servo data in spaced apart servo fields, wherein the selected data sector is disposed between an adjacent pair of the servo fields along the selected track.

17. The data storage device of claim 13, wherein the control circuit uses a selected one of a channel quality measurement or a bit error rate (BER) measurement to select the first and second offset values.

18. The data storage device of claim 13, wherein the control circuit is further configured to transfer the user data recovered from the selected data sector to a host device, and to direct a rewriting of the user data recovered from the selected data sector to the medium.

19. A data storage device comprising:
a rotatable data recording medium on which is defined a plurality of concentric tracks, each of the tracks having a plurality of data sectors;
a moveable data transducer having a write element configured to write user data to the data sectors and a read element configured to read the user data from the data sectors; and
a control circuit configured to, responsive to detection of a read error associated with a selected data sector on a selected track, perform a read retry operation to recover the user data from the selected data sector by radially advancing the read element in a single selected radial direction from a first radial offset value with respect to a center of the selected track at a beginning portion of the selected data sector to a different second offset value with respect to the center of the selected track at an end portion of the selected data sector during recovery of the user data from the selected data sector, the read retry operation comprising applying the first offset value to the read element and obtaining a first readback amplitude response from a first portion of the data sector that exceeds a selected threshold, applying the second offset value to the read element and obtaining a second readback amplitude response from a different, second portion of the data sector that exceeds a selected threshold, wherein the first offset value provides a third readback amplitude response from the second portion of the data sector below the selected threshold and the second offset value provides a fourth readback amplitude from the first portion of the data sector below the selected threshold.

20. The data storage device of claim 19, wherein the medium is a magnetic recording medium and the selected data sector on the selected track is partially encroached by data on an immediately adjacent track at a variable rate along the length of the selected data sector, wherein the radial advancement of the read element by the control circuit follows a contour of said encroachment by the immediately adjacent track.

* * * * *

UNITED STATES PATENT AND TRADEMARK OFFICE
CERTIFICATE OF CORRECTION

PATENT NO. : 9,875,763 B1  
APPLICATION NO. : 15/332475  
DATED : January 23, 2018  
INVENTOR(S) : Jason C. Jury, Xiong Liu and Joshua W. Christensen Page 1 of 1

It is certified that error appears in the above-identified patent and that said Letters Patent is hereby corrected as shown below:

On the Title Page

Item (72) Inventors:
"Siong Liu, Singapore (SG)" should be "Xiong Liu, Singapore (SG)"

Signed and Sealed this
Eighteenth Day of September, 2018

Andrei Iancu
*Director of the United States Patent and Trademark Office*